United States Patent
Senger et al.

(10) Patent No.: US 11,962,410 B2
(45) Date of Patent: *Apr. 16, 2024

(54) USER STATION FOR A SERIAL BUS SYSTEM, AND METHOD FOR COMMUNICATING IN A SERIAL BUS SYSTEM

(71) Applicant: Robert Bosch GmbH, Stuttgart (DE)

(72) Inventors: Christian Senger, Stuttgart (DE); Arthur Mutter, Neuhausen (DE); Christian Horst, Dusslingen (DE); Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 48 days.

This patent is subject to a terminal disclaimer.

(21) Appl. No.: 17/777,369

(22) PCT Filed: Dec. 1, 2020

(86) PCT No.: PCT/EP2020/084122
§ 371 (c)(1),
(2) Date: Jul. 8, 2022

(87) PCT Pub. No.: WO2021/110675
PCT Pub. Date: Jun. 10, 2021

(65) Prior Publication Data
US 2022/0407619 A1  Dec. 22, 2022

(30) Foreign Application Priority Data
Dec. 2, 2019 (DE) .................. 10 2019 218 715.3

(51) Int. Cl.
*H04L 1/00* (2006.01)
*H03M 13/09* (2006.01)
(Continued)

(52) U.S. Cl.
CPC ........ *H04L 1/0061* (2013.01); *H03M 13/096* (2013.01); *H04L 9/34* (2013.01); *H04L 2012/40215* (2013.01)

(58) Field of Classification Search
CPC ... H04L 1/0041; H04L 1/0061; H04L 12/413; H04L 12/40189; H03M 13/09; H03M 13/096
See application file for complete search history.

(56) References Cited

U.S. PATENT DOCUMENTS

2014/0016654 A1* 1/2014 Yakashiro ............. H04L 12/413
370/516
2016/0094312 A1* 3/2016 Fredriksson .......... H04L 1/0041
714/807
(Continued)

FOREIGN PATENT DOCUMENTS

DE   102013020522 A1   6/2015
DE   102015209201 A1   3/2016
(Continued)

OTHER PUBLICATIONS

ISO 11898-1:2015 Standard, "Road Vehicles—Controller Area Network (CAN)—Part 1: Data Link Layer and Physical Signalling," 2015, pp. 1-74.
(Continued)

*Primary Examiner* — Shelly A Chase
(74) *Attorney, Agent, or Firm* — NORTON ROSE FULBRIGHT US LLP; Gerard A. Messina

(57) ABSTRACT

A user station for a serial bus system. The user station includes a communication control device for controlling a communication of the user station with at least one other user station, and a transceiver device to serially transmit a transmission signal generated by the communication control device onto a bus and to serially receive signals from the bus. The communication control device generates the trans-
(Continued)

mission signal according to a frame, and inserts a header check sum into the frame, only bits of a frame header that is situated in front of a data field provided for useful data in the frame being included in the computation. For computing the header check sum, the communication control device uses a predetermined starting value and a predetermined check sum polynomial.

13 Claims, 5 Drawing Sheets

(51) Int. Cl.
  *H04L 9/34* (2006.01)
  *H04L 12/40* (2006.01)

(56) References Cited

U.S. PATENT DOCUMENTS

2017/0289321 A1  10/2017  Hartwich et al.
2019/0020499 A1*  1/2019  Meier ................... H03M 13/09
2020/0379941 A1*  12/2020  Okajima ........... H04L 12/40189

FOREIGN PATENT DOCUMENTS

| | | |
|---|---|---|
| JP | 2011083006 A | 4/2011 |
| JP | 2017532852 A | 11/2017 |
| WO | 2013000916 A1 | 1/2013 |
| WO | 2019030214 A1 | 2/2019 |

OTHER PUBLICATIONS

International Search Report for PCT/EP2020/084122 dated Mar. 4, 2021.

Vector Germany, CAN—Still Room for Improvement [online], (2019), pp. 7, 9, 11-17, 19-22; URL:https://cdn.vector.com/cms/content/events/2019/VTT19/presentations/VTT19_2410201_CAN_XL_Room_for_Improvement.pdf.

* cited by examiner

USER STATION FOR A SERIAL BUS SYSTEM, AND METHOD FOR COMMUNICATING IN A SERIAL BUS SYSTEM

FIELD

The present invention relates to a user station for a serial bus system, and a method for communicating in a serial bus system that operates with a high data rate as well as great flexibility and with a high level of error robustness.

BACKGROUND INFORMATION

Bus systems for the communication between sensors and control units, for example in vehicles, are intended to allow the transfer of a large data volume, depending on the number of functions of a technical facility or a vehicle. Often there is a requirement for the data to be transferred from the sender to the receiver more quickly than previously, and also for large data packets to be transferable as needed.

In vehicles, a bus system is currently in the introduction phase, in which data are transferred as messages under the ISO 11898-1:2015 standard, as a CAN protocol specification with CAN FD. The messages are transferred between the bus users of the bus system, such as the sensor, control unit, transducer, etc. With most manufacturers, CAN FD is used in the vehicle at a 2 Mbit/s data bit rate and a 500 kbit/s arbitration bit rate in the first step.

To allow even higher data rates, at the present time a successor bus system for CAN FD (referred to below as CAN XL) is being developed. In addition to the strict data transport, CAN XL is intended to also support other functions via the CAN bus, such as functional safety, data security, and quality of service (QoS). These are basic properties that are required in an autonomously traveling vehicle.

It is very advantageous when CAN XL and CAN FD as well as conventional CAN are compatible. In such a case, a distinction is made between CAN FD and CAN XL frames with the aid of the res bit in the CAN FD frame. Due to the compatibility, up to this res bit, the rules for dynamic stuff bits that are used for the CAN FD arbitration field are also to be applied for CAN XL.

For the functional safety of a system, it is very advantageous and important for the residual error probability to be as small as possible. Class 1 errors, namely, bits (bit flips) sampled erroneously in an inverted manner, and/or class 2 errors, namely, locally accumulated bit errors (burst errors), may be detected with sufficient probability with the aid of a check sum (cyclic redundancy check (CRC)). It is to be noted that a receiving user station also carries out a format check of the frame. This assists in particular with also detecting burst errors (packet errors). The quality of the error detection may be expressed by the residual error probability. The residual error probability indicates how likely it is that a frame is accepted as correct, despite errors in a receiving user station (reception node) of the bus system that is not a sender of the frame.

For conventional CAN, the CRC computation has the following disadvantage. For conventional CAN, the dynamic stuff bits are not included in the CRC computation. For this reason, for conventional CAN there is a class 3 of errors which the check sum (CRC) cannot reliably detect. This error (class 3) is caused by "flipping" of only two bits, which is also referred to as bit flip. One bit flip generates a dynamic stuff condition, and the other bit flip cancels a dynamic stuff condition. The order of the bit flips in the serially transferred bits (bit stream) does not matter. Thus, the CRC computation does not detect such an error with a high probability, even if the CRC computation actually can reliably detect five bit flips (class 1 error) for conventional CAN. A class 3 error is thus a particularly problematic case or a critical error.

In order for CAN FD to be robust against the class 3 error, the dynamic stuff bits are included in the CRC computation for CAN FD. However, it has subsequently been found that there is a class 4 error here that is not detected by the CAN FD CRC. This class 4 error is an individual bit drop or a bit insertion into the data stream of the receiving user station for a dynamic stuff condition. This means that due to an incorrect resynchronization, the receiving user station "sees" one bit more or one bit less than is actually transferred from the sending user station (transmission node). However, this is not apparent, since for CAN, the dynamic stuff bits are inserted with the same value only after 5 identical bits.

The inclusion of the dynamic stuff bits in the CRC computation for CAN FD makes a "stuff bit count" in the CRC field necessary. This stuff bit count reduces the probability that a class 4 error remains undiscovered, but does not completely solve the problem. Furthermore, such a stuff bit count results in complexity, and data overhead which lowers the transferable useful data rate.

In addition, for CAN FD there is no header check sum (header CRC). As a result, an error in the code of the data length field (data length code (DLC)) cannot be detected.

Thus, a bit error in the code of the data length field may result in a receiving user station (reception node) of the bus system, which is not a sender of the CAN FD frame, decoding an incorrect frame length in the CAN FD frame. Therefore, the receiving user station (reception node) checks the check sum (CRC) at the wrong location.

If the CRC computation for CAN XL were carried out in the same way as for CAN FD, CAN XL would have the same disadvantages as CAN FD.

SUMMARY

An object of the present invention is to provide a user station for a serial bus system and a method for communicating in a serial bus system, which solve the above-mentioned problems. In particular, an object is to provide a user station for a serial bus system, and a method for communicating in a serial bus system, in which errors in conjunction with dynamic stuff bits in a bit stream are detected with high reliability in order to achieve a high level of error robustness of the communication, even for a high data rate and an increase in the quantity of the useful data per frame.

The object may be achieved by a user station for a serial bus system in accordance with the present invention. In accordance with an example embodiment of the present invention, the user station includes a communication control device for controlling a communication of the user station with at least one other user station of the bus system, and a transceiver device that is designed to serially transmit a transmission signal, generated by the communication control device, onto a bus of the bus system, and that is designed to serially receive signals from the bus of the bus system, the communication control device being designed to generate the transmission signal according to a frame, and to insert a header check sum into the frame, only bits of a frame header that is situated in front of a data field provided for useful data in the frame being included in the computation, the communication control device being designed to insert dynamic stuff bits into the frame header in such a way that an inverse stuff bit is inserted into the bit stream of the frame after 5 identical bits in succession, and for computing the header check sum, the communication control device being designed to use a predetermined starting value and a predetermined check sum polynomial with which the intermediate result of the computation of the header check sum is not equal to a zero vector for the portion of the frame header in which dynamic stuff bits are used.

Due to the design of the user station, a high error detection probability for the computation of the header check sum is possible with CAN XL. Errors in header check sum HCRC in conjunction with dynamic stuff bits may thus be minimized. As a result, errors in the communication in the bus system may be quickly and reliably discovered.

Overall, due to its design the described user station may avoid the two mentioned disadvantages of CAN FD in conjunction with stuff bits in a very satisfactory manner. This means that the user station may detect an error with sufficient reliability during the sampling of the data length code. In addition, due to its design the user station may still optionally save additional fields in the frame in order to increase the transferable useful data rate. Consequently, for the user station described above, for example a "stuff count" such as for CAN FD is not necessarily required.

As a result, by use of the user station, transmission and reception of the frames may be ensured with great functional safety and great flexibility with regard to instantaneous events during operation of the bus system and at a low error rate, even with an increased volume of useful data per frame.

By use of the user station in the bus system, it is thus possible in particular to maintain an arbitration according to CAN in a first communication phase and still increase the transfer rate considerably compared to CAN or CAN FD.

The method carried out by the user station may also be used when at least one CAN user station and/or at least one CAN FD user station that send(s) messages according to the CAN protocol and/or CAN FD protocol are/is also present in the bus system.

Advantageous further embodiments of the user station are disclosed herein.

The predetermined starting value may be equal to (1,0,0, 0,0,0,0,0,0,0,0,0).

Alternatively, the predetermined starting value is equal to (0,0,1,1,0,0,0,0,0,0,0,0).

It is possible for the communication control device to be designed, for the computation of the header check sum, to use at least one switching element of an electrical circuit which is settable to the predetermined starting value, a predetermined check sum polynomial being implemented by the switching element or the electrical circuit.

Predetermined check sum polynomial CRC_P is possibly equal to $x^{13}+x^{12}+x^{11}+x^{8}+x^{7}+x^{6}+x^{5}+x^{2}+x^{1}+1$.

For the optional compatibility with CAN FD, the communication control device is designed to insert dynamic stuff bits only into a first portion of the frame header.

According to one option of the present invention, the communication control device is designed to insert a field, in which the number of dynamic stuff bits is encoded, into the frame, the communication control device being designed to insert the at least one field in front of a data field in which useful data of the frame are inserted.

In accordance with an example embodiment of the present invention, the transceiver device for serially transmitting a transmission signal, generated by the communication control device, onto a bus of the bus system is optionally designed in such a way that for a message that is exchanged between user stations of the bus system, the bit time of a signal transmitted onto the bus in a first communication phase may be different from a bit time of a signal transmitted in a second communication phase.

It is possible for the frame that is formed for the message to have a design that is compatible with CAN FD, in a first communication phase it being negotiated which of the user stations of the bus system in a subsequent second communication phase obtains, at least temporarily, exclusive, collision-free access to the bus.

Moreover, the object may be achieved by a user station for a serial bus system in accordance with the present invention. In accordance with an example embodiment of the present invention, the user station includes a communication control device for controlling a communication of the user station with at least one other user station of the bus system, and a transceiver device that is designed to serially transmit a transmission signal, generated by the communication control device, onto a bus of the bus system, and that is designed to serially receive signals from the bus of the bus system, the communication control device being designed to generate the transmission signal according to a frame, and to insert a header check sum into the frame, only bits of a frame header that is situated in front of a data field provided for useful data in the frame being included in the computation, the communication control device being designed to insert dynamic stuff bits into the frame header in such a way that an inverse stuff bit is inserted into the bit stream of the frame after 5 identical bits in succession, and the communication control device being designed, for the computation of the header check sum, to use at least one switching element of an electrical circuit which is settable to a predetermined starting value, a predetermined check sum polynomial being implemented by the switching element or the electrical circuit, the predetermined check sum polynomial being equal to $x^{13}+x^{12}+x^{11}+x^{8}+x^{7}+x^{6}+x^{5}+x^{2}+x^{1}+1$.

The combination of the predetermined starting value and the predetermined check sum polynomial is possibly designed in such a way that the intermediate result of the computation of the header check sum is not equal to a zero vector for the portion of the frame header in which dynamic stuff bits are to be inserted by the communication control device.

The user station described above may be part of a bus system which also includes a bus and at least two user stations that are connected to one another via the bus in such a way that they may communicate serially with one another. At least one of the at least two user stations is a user station described above.

Moreover, the object may be achieved by a method for communicating in a serial bus system according to the present invention. In accordance with an example embodiment of the present invention, the method is carried out with a user station of the bus system that includes a communication control device and a transceiver device, the method including the steps: controlling, via the communication control device, a communication of the user station with at least one other user station of the bus system, and transmitting, via the transceiver device, a transmission signal, generated by the communication control device, onto a bus of the bus system, the transceiver device also being designed to serially receive signals from the bus of the bus system, generating, via the communication control device, the transmission signal according to a frame, the communication control device inserting a header check sum into the frame, only bits of a frame header that is situated in front of a data field provided for useful data in the frame being included in the computation, the communication control device inserting dynamic stuff bits into the frame header in such a way that an inverse stuff bit is inserted into the bit stream of the frame after 5 identical bits in succession, and for computing the header check sum, the communication control device using a predetermined starting value and a predetermined check sum polynomial with which the intermediate result of the computation of the header check sum is not equal to a zero vector for the portion of the frame header in which dynamic stuff bits are used.

The method yields the same advantages as stated above with regard to the user station.

Further possible implementations of the present invention also include combinations, even if not explicitly stated, of features or specific embodiments described above or discussed below with regard to the exemplary embodiments. Those skilled in the art will also add individual aspects as enhancements or supplements to the particular basic form of the present invention, in view of the disclosure herein.

BRIEF DESCRIPTION OF THE DRAWINGS

The present invention is described in greater detail below with reference to the figures, and based on exemplary embodiments.

Unless stated otherwise, identical or functionally equivalent elements are provided with the same reference numerals in the figures.

DETAILED DESCRIPTION OF EXAMPLE EMBODIMENTS

Figure 1:
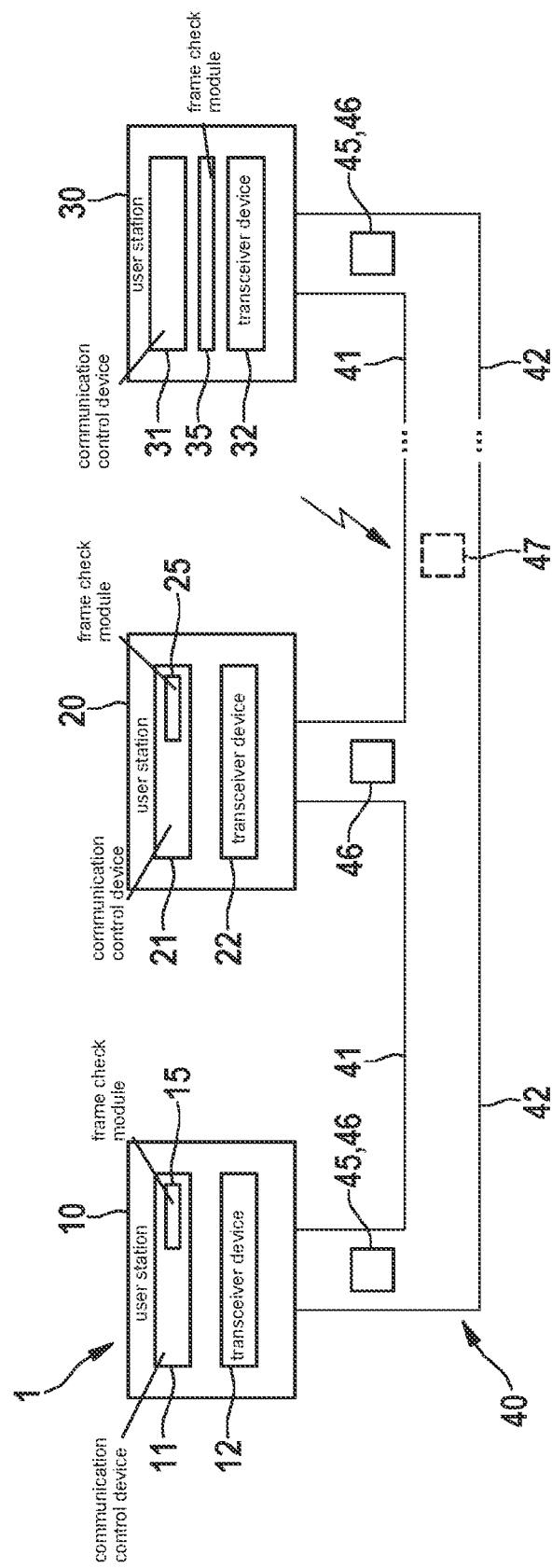
FIG. 1 shows a simplified block diagram of a bus system according to a first exemplary embodiment of the present invention.

FIG. 1 shows as an example a bus system 1 that is in particular the basis for the design of a CAN bus system, a CAN FD bus system, a CAN XL bus system, and/or modifications thereof, as described below. Bus system 1 may be used in a vehicle, in particular a motor vehicle, an aircraft, etc., or in a hospital, and so forth.

In FIG. 1, bus system 1 includes a plurality of user stations 10, 20, 30, each of which is connected to a first bus wire 41 and a second bus wire 42 at a bus 40. Bus wires 41, 42 may also be referred to as CAN_H and CAN_L or CAN XL_H and CAN XL_L, and are used for electrical signal transfer after coupling in the dominant levels or generating recessive levels or other levels for a signal in the transmission state. Messages 45, 46 in the form of signals are serially transferable between individual user stations 10, 20, 30 via bus 40. If an error occurs during the communication on bus 40, as illustrated by the serrated dark block arrow in FIG. 1, an error frame 47 (error flag) may optionally be transmitted. User stations 10, 20, 30 are, for example, control units, sensors, display devices, etc., of a motor vehicle.

As shown in FIG. 1, user station 10 includes a communication control device 11, a transceiver device 12, and a frame check module 15. User station 20 includes a communication control device 21 and a transceiver device 22. User station 30 includes a communication control device 31, a transceiver device 32, and a frame check module 35. Transceiver devices 12, 22, 32 of user stations 10, 20, 30 are each directly connected to bus 40, although this is not illustrated in FIG. 1.

Communication control devices 11, 21, 31 are each used to control a communication of particular user station 10, 20, 30 via bus 40 with at least one other user station of user stations 10, 20, 30 connected to bus 40.

Communication control devices 11, 31 create and read first messages 45, which are modified CAN messages 45, for example. Modified CAN messages 45 are built up based on a CAN XL format, which is described in greater detail with reference to FIG. 2 and in which particular frame check module 15, 35 is used. Communication control devices 11, 31 may also be designed to provide a CAN XL message 45 or a CAN FD message 46 for transceiver device 32 or receive it from same, as needed. Particular frame check modules 15, 35 are also used. Communication control devices 11, 31 thus create and read a first message 45 or second message 46, first and second messages 45, 46 differing by their data transmission standard, namely, CAN XL or CAN FD in this case.

Communication control device 21 may be designed as a conventional CAN controller according to ISO 11898-1: 2015, i.e., as a CAN FD-tolerant conventional CAN controller or a CAN FD controller. Communication control device 21 creates and reads second messages 46, for example CAN FD messages 46. CAN FD messages 46 may include 0 to 64 data bytes, which are also transferred at a much faster data rate than with a conventional CAN message transfer. In particular, communication control device 21 is designed as a conventional CAN FD controller.

Transceiver device 22 may be designed as a conventional CAN transceiver according to ISO 11898-1:2015 or as a CAN FD transceiver. Transceiver devices 12, 32 may be designed to provide messages 45 according to the CAN XL format or messages 46 according to the present CAN FD format for associated communication control device 11, 31 or receive the messages from same, as needed.

A formation and then transfer of messages 45 having the CAN XL format, in addition to the reception of such messages 45, is achievable by use of the two user stations 10, 30.

Figure 2:
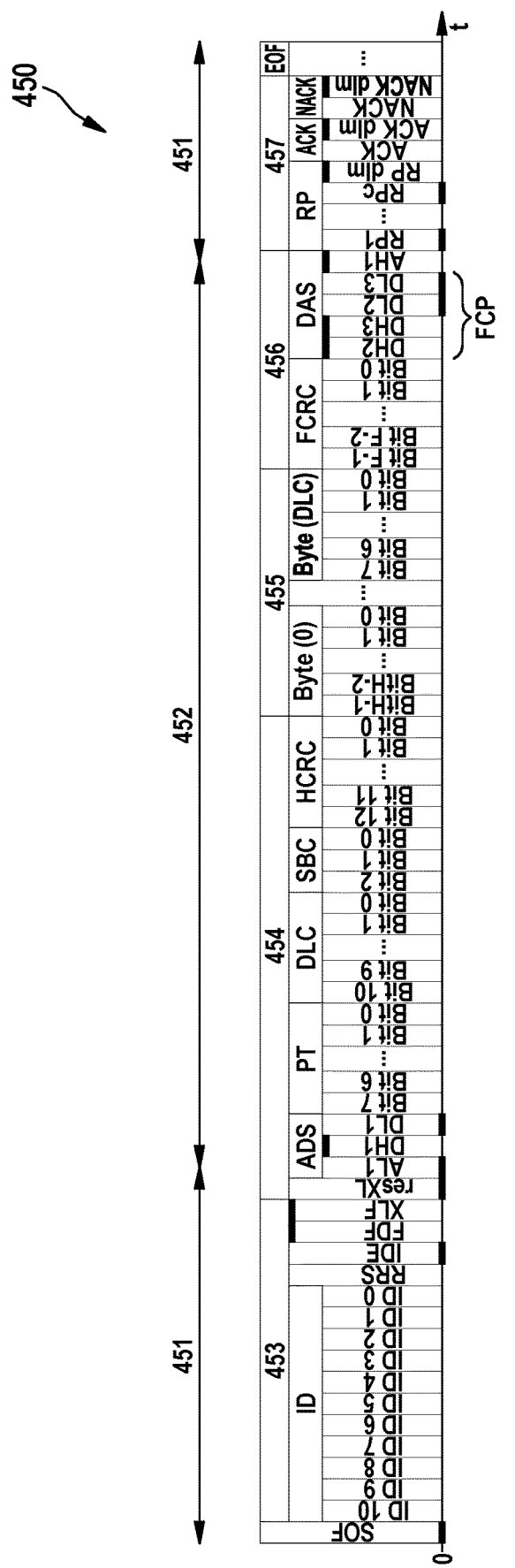
FIG. 2 shows a diagram for illustrating the design of a message that may be sent from a user station of the bus system according to the first exemplary embodiment of the present invention.

FIG. 2 shows for message 45 a CAN XL frame 450, which is provided by communication control device 11 for transceiver device 12 for transmitting onto bus 40. In the present exemplary embodiment, communication control device 11 creates frame 450 so as to be compatible with CAN FD, as also illustrated in FIG. 2. The same analogously applies for communication control device 31 and transceiver device 32 of user station 30.

According to FIG. 2, for the CAN communication on bus 40, CAN XL frame 450 is divided into different communication phases 451, 452, namely, an arbitration phase 451 and a data phase 452.

Frame 450 includes an arbitration field 453, a control field 454, a data field 455, a check sum field 456 for a check sum FCRC, a switchover sequence ADS, and an acknowledgment field 457.

In arbitration phase 451, with the aid of an identifier ID in arbitration field 453, bitwise negotiation is carried out between user stations 10, 20, 30 concerning which user station 10, 20, 30 would like to send message 45, 46 having the highest priority, and therefore for the next time period for sending in subsequent data phase 452 obtains exclusive access to bus 40 of bus system 1. A physical layer, similarly as with CAN and CAN FD, is used in arbitration phase 451. The physical layer corresponds to the bit transfer layer or layer one of the conventional Open Systems Interconnection (OSI) model.

An important point during phase 451 is that the conventional CSMA/CR method is used, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

Consequently, the CSMA/CR method must provide so-called recessive states on bus 40, which may be overwritten by other user stations 10, 20, 30 with dominant states on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

In data phase 452, in addition to a portion of control field 454, the useful data of the CAN XL frame or of message 45 from data field 455 and check sum field 456 for check sum FCRC, and also a field DAS, which is used to switch over from data phase 452 back to arbitration phase 451, are sent.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In general, in the bus system with CAN XL, in comparison to CAN or CAN FD the following differing properties may be achieved:
 a) adopting and optionally adapting proven properties that are responsible for the robustness and user-friendliness of CAN and CAN FD, in particular a frame structure including an identifier and arbitration according to the CSMA/CR method,
 b) increasing the net data transfer rate, in particular to approximately 10 megabits per second,
 c) increasing the quantity of the useful data per frame, in particular to approximately 4 kbytes or some other arbitrary value.

As illustrated in FIG. 2, in arbitration phase 451 user station 10 partially uses as the first communication phase, in particular up to and including the FDF bit, a format according to CAN/CAN FD according to ISO 11898-1:2015. In contrast, beginning with the FDF bit in the first communication phase and in the second communication phase (data phase 452), user station 10 uses a CAN XL format, as described below.

In the present exemplary embodiment, CAN XL and CAN FD are compatible. The res bit according to CAN FD, referred to below as the XLF bit, is utilized for switching from the CAN FD format over to the CAN XL format. Therefore, the frame formats of CAN FD and CAN XL are identical up to the res bit. Not until the res bit does a receiver detect in which format the frame is sent. A CAN XL user station, i.e., user stations 10, 30 here, also support(s) CAN FD.

As an alternative to frame 450 shown in FIG. 2, in which an identifier including 11 bits is used, a CAN XL expanded frame format is optionally possible in which an identifier including 29 bits is used. Up until the FDF bit, this is identical to the conventional CAN FD expanded frame format from ISO 11898-1:2015.

According to FIG. 2, frame 450 from the SOF bit up to and including the FDF bit is identical to the CAN FD base frame format according to ISO 11898-1:2015. Therefore, the conventional structure is not further explained here. Bits illustrated with a thick bar at their lower line in FIG. 2 are sent in frame 450 as dominant or "0". Bits illustrated with a thick bar at their upper line in FIG. 2 are sent in frame 450 as recessive or "1". In CAN XL data phase 452, symmetrical "1" and "0" levels are used instead of recessive and dominant levels.

In general, two different stuffing rules are applied in the generation of frame 450. Up until the XLF bit in control field 454, the dynamic bit stuffing rule from CAN FD applies, so that an inverse stuff bit is to be inserted after 5 identical bits in succession. Such stuff bits are also referred to as dynamic stuff bits. A fixed stuffing rule applies after a resXL bit in control field 454, so that a fixed stuff bit is to be inserted after a fixed number of bits. Alternatively, instead of only one stuff bit, 2 or more bits may be inserted as fixed stuff bits, as also described in greater detail below.

In frame 450, the FDF bit is directly followed by the XLF bit, which from the position corresponds to the "res bit" in the CAN FD base frame format, as mentioned above. If the XLF bit is sent as 1, i.e., recessive, it thus identifies frame 450 as a CAN XL frame. For a CAN FD frame, communication control device 11 sets the XLF bit as 0, i.e., dominant.

In frame 450, the XLF bit is followed by a resXL bit, which is a dominant bit for future use. For frame 450, the resXL bit must be sent as 0, i.e., dominant. However, if user station 10 receives a resXL bit as 1, i.e., recessive, receiving user station 10 goes into a protocol exception state, for example, as carried out with a CAN FD message 46 for res=1. Alternatively, the resXL bit could be defined the opposite way, i.e., that it must be sent as 1, i.e., recessive. In this case, for a dominant resXL bit the receiving user station goes into the protocol exception state.

In frame 450, the resXL bit is followed by a sequence ADS (arbitration data switch), in which a predetermined bit sequence is encoded. This bit sequence allows a simple and reliable switch from the bit rate of arbitration phase 451 (arbitration bit rate) over to the bit rate of data phase 452 (data bit rate). For example, the bit sequence of the ADS sequence is made up, among other things, of an AL1 bit that is sent as dominant, i.e., 0. The AL1 bit is the last bit of arbitration phase 451. In other words, the AL1 bit is the last bit prior to the switchover into data phase 452 with the short bits. The physical layer in transceiver device 12, 22, 32 is switched over within the AL1 bit. The AL1 bit could also have the value 1, depending on which value (0 or 1) is better suited for the switchover of the physical layer in transceiver device 12, 32 (transceiver). The two subsequent bits DH1 and DL1 are already transmitted at the data bit rate. For CAN XL, bits DH1 and DL1 are thus temporally short bits of data phase 452.

In frame 450, sequence ADS is followed by a PT field that denotes the contents of data field 455. The contents indicate what type of information is contained in data field 455. For example, the PT field indicates whether an Internet Protocol (IP) frame, a tunneled Ethernet frame, or some other frame is present in data field 455.

The PT field is followed by a DLC field into which data length code DLC, which indicates the number of bytes in data field 455 of frame 450, is inserted. Data length code DLC may assume any value from 0 up to the maximum length of data field 455 or the data field length. If the maximum data field length is in particular 2048 bits, data length code DLC requires 11 bits, under the assumptions that DLC=0 means a data field length that includes 1 byte, and DLC=2047 means a data field length that includes 2048 bytes. Alternatively, a data field 455 having the length 0 could be allowed, as with CAN, for example. DLC=0 would encode, for example, the data field length with 0 byte. With 11 bits, for example, the maximum encodable data field length is then $(2^{11})-1=2047$.

In the example from FIG. 2, in frame 450 the DLC field is followed by an SBC field. The abbreviation SBC stands for "stuff bit count." The SBC field encodes the number of dynamic stuff bits in the header of frame 450. In principle, the SBC field may be placed at any location in the header of frame 450, between the ADS field and the end of the header of frame 450. A placement of the SBC field in front of a header check sum HCRC is advantageous so that the SBC field may be safeguarded by header check sum HCRC.

In frame 450 from FIG. 2, the SBC field is followed by a header check sum HCRC. Header check sum HCRC is a check sum for safeguarding the header of frame 450, i.e., all relevant bits from the start of frame 450 including the SOF bit to the start of header check sum HCRC, including all dynamic, and optionally, fixed, stuff bits up to the start of header check sum HCRC. The relevant bits include only the bits of the frame header that have a changeable value. In other words, the relevant bits include no bits that always have a fixed value in frame 450. Thus, such bits having an unchangeable value are not safeguarded, since these bits have a fixed value. The length of header check sum HCRC, and thus of the check sum polynomial according to cyclic redundancy check CRC, is to be selected corresponding to the desired Hamming distance, which is a measure of the dissimilarity of character strings. The measure or the Hamming distance indicates the magnitude of the number of different locations in two character strings or two bit streams of equal length. For a data length code DLC of 11 bits, the data word to be safeguarded by header check sum HCRC is longer than 27 bits. Therefore, in order to achieve a Hamming distance of 6, the polynomial of header check sum HCRC must be at least 13 bits long. The computation of header check sum HCRC is described in greater detail with reference to FIG. 3.

In frame 450, header check sum HCRC is followed by data field 455. Data field 455 is made up of 1 to n data bytes, where n is, for example, 2048 bytes or 4096 bytes or some other arbitrary value. Alternatively, a data field length of 0 is possible. The length of data field 455 is encoded in the DLC field, as described above.

In frame 450, data field 455 is followed by a frame check sum FCRC. Frame check sum FCRC is made up of the bits of frame check sum FCRC. The length of frame check sum FCRC, and thus of the CRC polynomial, is to be selected corresponding to the desired Hamming distance. Frame check sum FCRC safeguards entire frame 450. Alternatively, only data field 455 is optionally safeguarded with frame check sum FCRC.

In frame 450, frame check sum FCRC is followed by sequence DAS (data arbitration switch) in which a predetermined bit sequence is encoded. This bit sequence allows a simple and reliable switch from the data bit rate of data phase 452 over to the arbitration bit rate of arbitration phase 451. For example, the bit sequence begins with data bits DH2, DH3, which are sent as 1, and data bits DL2, DL3, which are sent as 0, as shown in FIG. 2. These are the last 4 bits of data phase 452. Thus, the DL3 bit is the last short bit, i.e., the last bit prior to the switchover into arbitration phase 451 with the long bits. The bits are followed by an AH1 bit having the value 1 of arbitration phase 451. The physical layer in transceiver device 12, 32 (transceiver) is switched over within the AH1 bit. The AH1 bit could alternatively have the value 0, depending on which value (0 or 1) is better suited for the switchover of the physical layer in transceiver device 12, 32 (transceiver). An RX user station 10, 30, which is only a receiver of frame 450, i.e., has not sent received frame 450, uses bit sequence DH2, DH3, DL2, DL3 not only for the synchronization, but also as a format check pattern. With this bit sequence, RX user station 10, 30 may recognize whether it is sampling the bit stream received from bus 40 in a shifted manner, for example shifted by 1 bit or 2 bits, etc. According to another example, the DAS field generally includes three bits, i.e., the DH2 bit, the DL2 bit, and an AH1 bit. Of the bits, the first bit and last bit are sent as 1, and the middle bit is sent as 0.

In the above examples, the last synchronization prior to the switchover from data phase 452 into arbitration phase 451 may be carried out at the edge between the DH3 bit and the DL2 bit or between the DH2 bit and the DL2 bit in the receiving user station.

Thus, in the present exemplary embodiment, sequence DAS contains a format check pattern FCP via which user stations 10, 30, in particular their frame check modules 15, 35, are able to detect in a received frame 450 a shift of the bit stream, even if associated user stations 10, 30 are not senders, but instead are only receivers of frame 450. The longer the bit pattern of the FCP field, the greater or stronger is the shift that may be detected in receiving user station 10, 30. The most advantageous bit pattern for the shift detection contains an even number of M bits, the first M/2 bits containing a 1 and the subsequent M/2 bits containing a 0. In the example from FIG. 2, with an FCP field including 4 bits, the first two bits are sent as recessive, i.e., 1. The last two bits of the FCP field are sent as dominant, i.e., 0. Thus, the FCP field including four bits according to FIG. 2, due to additional bits DH3, DL3, differs from the customary two bits at the start of the FCP field. However, the edge from recessive to dominant in the FCP field from FIG. 2 may fulfill the same function as in a DAS field, which does not include bits DH3, DL3.

In general, it is possible that in the FCP field, the first M/2 bits contain a 0 and the subsequent M/2 bits contain a 1. A shift by M−1 may be detected using field FCP. This is described in greater detail below with reference to FIG. 3.

In frame 450, sequence DAS is followed by an acknowledgment field 457, which starts with an RP field. A synchronization pattern (sync pattern) is kept in the RP field, and allows a receiving user station 10, 30 to detect the start of arbitration phase 451 after data phase 452. The synchronization pattern allows receiving user stations 10, 30, which cannot detect the correct length of data field 455, for example due to an erroneous header check sum HCRC, to synchronize. These user stations may subsequently send a "negative acknowledge" in order to communicate the incorrect reception. This is very important in particular when CAN XL does not allow error frames 47 (error flags) in data field 455.

The RP field is followed by an acknowledgment (ACK) field 457 made up of multiple bits for acknowledgment or non-acknowledgment of a correct receipt of frame 450. In the example from FIG. 2, an ACK bit, an ACK dlm bit, a NACK bit, and a NACK dlm bit are provided. The NACK bit and the NACK dlm bit are optional bits. Receiving user stations 10, 30 send the ACK bit as dominant when they have correctly received frame 450. The sending user station sends the ACK bit as recessive. Therefore, the bit in frame 450 originally sent onto bus 40 may be overwritten by receiving user stations 10, 30. The ACK dlm bit is sent as a recessive bit, which is used for separation from other fields. The NACK bit and the NACK dlm bit are used so that a receiving user station may signal an incorrect reception of frame 450 on bus 40. The function of the bits is the same as that of the ACK bit and the ACK dlm bit.

In frame 450, acknowledgment (ACK) field 457 is followed by an end field (end of frame (EOF)). The bit sequence of end field EOF is used to denote the end of frame 450. End field EOF ensures that 8 recessive bits are transmitted at the end of frame 450. This is a bit sequence that cannot occur within frame 450. As a result, the end of frame 450 may be reliably detected by user stations 10, 20, 30.

End field EOF has a length that is different, depending on whether a dominant bit or a recessive bit has been observed in the NACK bit. If the sending user station has received the NACK bit as dominant, end field EOF includes 7 recessive bits. Otherwise, end field EOF is only 5 recessive bits long.

In frame 450, end field EOF is followed by an interframe space IFS, not illustrated in FIG. 2. This interframe space IFS is designed according to ISO 11898-1:2015, as with CAN FD.

Figure 3:
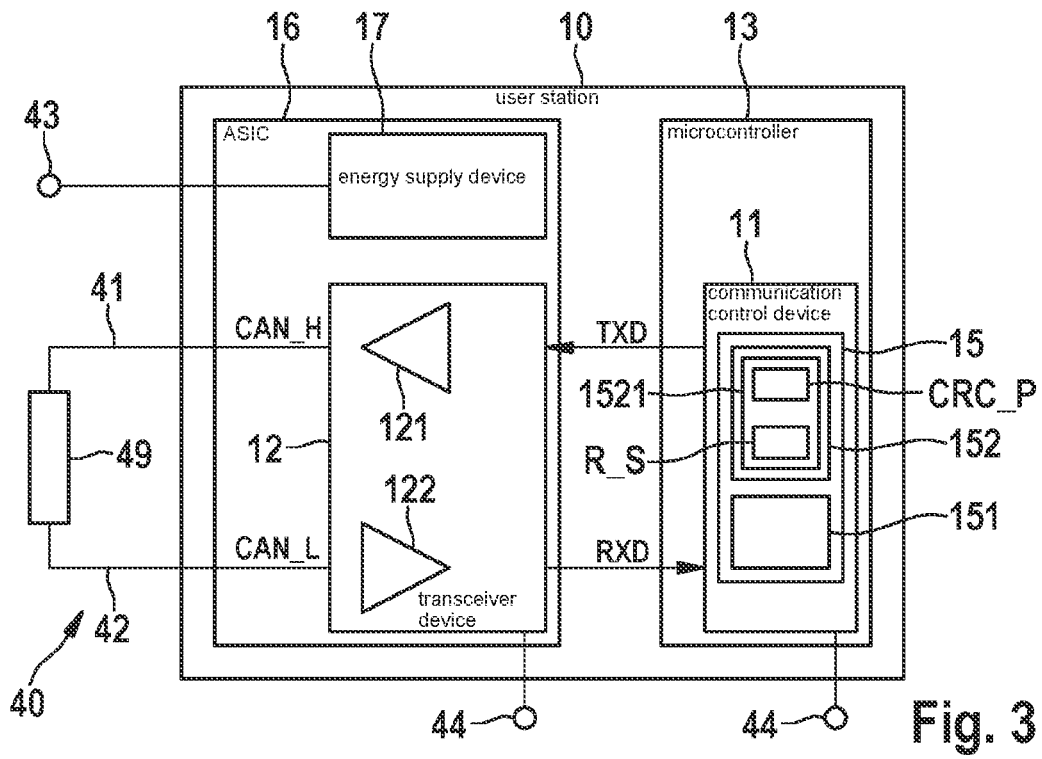
FIG. 3 shows a simplified schematic block diagram of a user station of the bus system according to the first exemplary embodiment of the present invention.

FIG. 3 shows the basic design of user station 10 together with communication control device 11, transceiver device 12, and frame check module 15, which is part of communication control device 11. User station 30 has a design similar to that shown in FIG. 3, except that frame check module 35 according to FIG. 1 is situated separately from communication control device 31 and transceiver device 32. Therefore, user station 30 is not separately described.

According to FIG. 3, in addition to communication control device 11 and transceiver device 12, user station 10 includes a microcontroller 13 with which control device 11 is associated, and a system application-specific integrated circuit (ASIC) 16, which alternatively may be a system base chip (SBC) on which multiple functions necessary for an electronics assembly of user station 10 are combined. In addition to transceiver device 12, an energy supply device 17 that supplies transceiver device 12 with electrical energy is installed in system ASIC 16. Energy supply device 17 generally supplies a voltage CAN_Supply of 5 V. However, depending on the requirements, energy supply device 17 may supply some other voltage having a different value. Additionally or alternatively, energy supply device 17 may be designed as a power source.

Frame check module 15 includes an insertion block 151 and an evaluation block 152. Evaluation block 152 uses a predetermined electrical circuit 1521 for implementing a predetermined CRC polynomial CRC_P for computing header check sum HCRC. Evaluation block 152 initializes the computation of header check sum HCRC for each frame 450, using a starting value R_S. Frame check module 15, in particular its evaluation block 152, is thus used to form and check the header check sum and the frame check sum, and to check the number of dynamic stuff bits. Frame check module 15 is described in greater detail below.

Transceiver device 12 also includes a transmission module 121 and a reception module 122. Even though transceiver device 12 is consistently referred to below, it is alternatively possible to provide reception module 122 in a separate device externally from transmission module 121. Transmission module 121 and reception module 122 may be designed as a conventional transceiver device 22. Transmission module 121 may in particular include at least one operational amplifier and/or one transistor. Reception module 122 may in particular include at least one operational amplifier and/or one transistor.

Transceiver device 12 is connected to bus 40, or more precisely, to its first bus wire 41 for CAN_H or CAN XL_H and its second bus wire 42 for CAN_L or CAN XL_L. The supplying of voltage for energy supply device 17 for supplying first and second bus wires 41, 42 with electrical energy, in particular with voltage CAN Supply, takes place via at least one terminal 43. The connection to ground or CAN_GND is achieved via a terminal 44. First and second bus wires 41, 42 are terminated via a terminating resistor 49.

In transceiver device 12, first and second bus wires 41, 42 are not just connected to transmission module 121, also referred to as a transmitter, and to reception module 122, also referred to as a receiver, even though the connection in FIG. 3 is not shown for simplification.

During operation of bus system 1, transmission module 121 converts a transmission signal TXD or TxD of communication control device 11 into corresponding signals CAN XL_H and CAN XL_L for bus wires 41, 42, and transmits these signals CAN XL_H and CAN XL_L onto bus 40 at the terminals for CAN_H and CAN_L.

Figure 4:
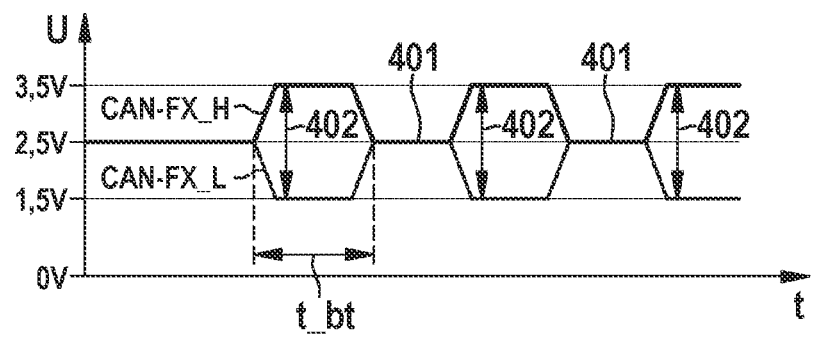
FIG. 4 shows a temporal profile of bus signals CAN XL_H and CAN XL_L for the user station according to the first exemplary embodiment of the present invention.

According to FIG. 4, reception module 122 forms a reception signal RXD or RxD from signals CAN XL_H and CAN XL_L that are received from bus 40, and passes it on to communication control device 11, as shown in FIG. 3. With the exception of an idle or standby state, transceiver device 12 with reception module 122 during normal operation always listens to a transfer of data or messages 45, 46 on bus 40, in particular regardless of whether or not transceiver device 12 is the sender of message 45.

Figure 5:
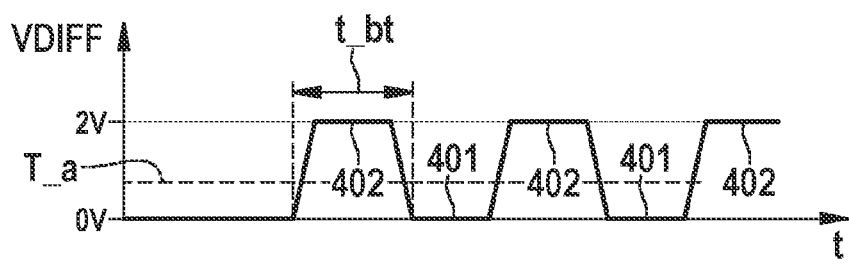
FIG. 5 shows a temporal profile of a differential voltage VDIFF of bus signals CAN XL_H and CAN XL_L for the user station according to the first exemplary embodiment of the present invention.

According to the example from FIG. 4, signals CAN XL_H and CAN XL_L, at least in arbitration phase 451, include dominant and recessive bus levels 401, 402, as from CAN. A difference signal VDIFF=CAN XL_H−CAN XL_L, shown in FIG. 5, is formed on bus 40. The individual bits of signal VDIFF with bit time t_bt may be detected using a reception threshold of 0.7 V. In data phase 452 the bits of signals CAN XL_H and CAN XL_L are sent more quickly, i.e., with a shorter bit time t_bt, than in arbitration phase 451. Thus, signals CAN XL_H and CAN XL_L in data phase 452 differ from conventional signals CAN_H and CAN_L, at least in their faster bit rate.

The sequence of states 401, 402 for signals CAN XL_H, CAN XL_L in FIG. 4 and the resulting pattern of voltage VDIFF from FIG. 5 are used only for illustrating the function of user station 10. The sequence of data states for bus states 401, 402 is selectable as needed.

In other words, transmission module 121 in a first operating mode according to FIG. 4 generates a first data state as bus state 402 with different bus levels for two bus wires 41, 42 of the bus line, and a second data state as bus state 401 with the same bus level for the two bus wires 41, 42 of the bus line of bus 40.

In addition, transmission module 121 transmits the bits onto bus 40 at a higher bit rate for the temporal profiles of signals CAN XL_H, CAN XL_L in a second operating mode, which includes data phase 452. CAN XL_H and CAN XL_L signals may also be generated in data phase 452 with a different physical layer than with CAN FD. The bit rate in data phase 452 may thus be increased even further than with CAN FD.

Frame check module 15 from FIG. 3, in particular its insertion block 151, is used to insert the SBC field and the FCP field into frame 450 when user station 10 acts as the sender of frame 450. In addition, for computing header check sum HCRC, frame check module 15 from FIG. 3, in particular its evaluation block 152, is designed to use predetermined starting value R_S when user station 10 acts as the sender or receiver of frame 450. Predetermined starting value R_S is also referred to as the initialization (init) value. Evaluation block 152 is designed to compute, based on this starting value R_S, header check sum HCRC and to use predetermined CRC polynomial CRC_P, as mentioned above.

In the present exemplary embodiment, frame check module 15 from FIG. 3 is designed in such a way that the SBC field includes three bits, i.e., a bit0, a bit1, and a bit2. As a result, the SBC field generates as little data overhead as possible. In the SBC field, frame check module 15 enters the number of dynamic stuff bits into bits bit0 and bit1, and enters the parity of the first two bits into bit2.

In the present exemplary embodiment, insertion block 151 inserts the SBC field in front of header check sum HCRC in frame 450. Frame check module 15, in particular evaluation block 152, also uses the SBC field when forming header check sum HCRC as well as all dynamic stuff bits of the frame header. As a result, class 3 and class 4 errors are detectable.

Evaluation block 152 in the receiving user station may compare the number of received dynamic stuff bits in the frame header to the value in the SBC field, and may thus detect a deviation, i.e., error, in comparison to the actual number in the frame header.

In contrast, evaluation block 152 omits the dynamic stuff bits when forming frame check sum FCRC. However, evaluation block 152 includes the other bits of the frame header, such as the ID bit, RRS bit, etc., in the computation of frame check sum FCRC. These bits are thus doubly safeguarded. As a result, by use of frame check module 15, in particular its evaluation block 152, class 3 and class 4 errors that occur in conjunction with dynamic stuff bits are detectable with a very high probability.

For computing header check sum HCRC, evaluation block 152 proceeds from predetermined starting value R_S. Predetermined starting value R_S is R_S=(1,0,0,0,0,0,0,0, 0,0,0,0,0). Evaluation block 152 in particular includes, as a circuit switching element of electrical circuit 1521, a feedback shift register corresponding to the properties (coefficients) of CRC polynomial CRC_P. The value in the shift register is referred to below as vector R. Bitwise computation of the header check sum may be carried out using this feedback shift register. Evaluation block 152 initializes shift register R with starting value R_S at the start of each frame. The single "1" in vector R_S is at the position with the lowest value, also referred to as the LSB position.

Predetermined starting value R_S prevents an error case B. In error case B, a bit drop or a bit insertion occurs in the data stream of the receiving user station (reception node) for a dynamic stuff condition, at the same time the temporary value of the CRC computation of header check sum HCRC being a zero vector R="0 . . . 0". Error case B may occur due to an incorrect resynchronization, in which the reception node "sees" one bit more or one bit less than is actually transferred from the transmission node.

Example of a bit drop: 100000i becomes 100001
Example of a bit insertion: 100001 becomes 100000i
In these examples, "i" stands for a dynamic stuff bit having the value 1.

If in the computation of header check sum HCRC, in which dynamic stuff bits are included in the computation, the intermediate result gives vector R="0 . . . 0" in the stated examples, vector R="0 . . . 0" remains as long as only 0 bits are fed into the feedback shift register for the CRC computation in evaluation block 152. In other words, the result of the computation of header check sum HCRC remains the same when one 0 more or one 0 less is entered into the CRC computation. Thus, without predetermined starting value R_S, the CRC computation of evaluation block 152 is "blind" to this case, error case B, which involves dynamic stuff bits. Even a single error of this type results in the CRC check being unable to detect the error.

Predetermined starting value R_S=(1,0,0,0,0,0,0,0,0,0,0, 0,0) is selected based on the consideration that error case B can occur only in the first 17 bits of a serially transmitted frame 450. The reason is that dynamic stuff bits are used only in this portion of the header of frame 450. This first portion of the header of frame 450 is made up of 14 bits (SOF, ID, RRS, IDE) plus a maximum of 3 dynamic stuff bits, i.e., a total of 17 bits maximum. Therefore, this portion of the header of frame 450 is very short.

Since predetermined starting value R_S=(1,0,0,0,0,0,0,0, 0,0,0,0,0) is used by evaluation block 152 to compute header check sum HCRC, error case B cannot occur. As a result of this predetermined starting value R_S, vector R cannot assume value R="0 . . . 0" in the first 14 through 17 bits. The limitation to 14 bits applies if no dynamic stuff bits occur. The limitation to 17 bits applies if dynamic stuff bits occur. This result for the value of vector R is achieved for each valid bit sequence of a CAN frame 450, i.e., for example regardless of the value of sent identifier ID in frame 450. Use is made of the fact that the portion of the frame header considered by evaluation block 152 may theoretically have 2^17 possible bit sequences, but of these theoretically possible bit sequences some bit sequences cannot occur because the dynamic stuff bits are inserted.

When the subsequent bits of the header of frame 450, namely, the bits of identifier ID, the RRS bit, and dynamic stuff bits, are included in the computation of header check sum HCRC, stated predetermined starting value R_S achieves the desired effect, namely, to prevent error case B.

Alternatively, the two bits SOF, IDE with constant value may also be included in the computation of header check sum HCRC. In this case as well, the effect of preventing error case B is obtained. These are all bits, including the dynamic stuff bits, beginning with the SOF bit and going up to the dynamic stuff bit after the IDE bit.

Predetermined starting value R_S thus prevents vector R from being able to assume the value "0 . . . 0" as the result of the computation of header check sum HCRC during the first 17 bits of the header.

In the computation of header check sum HCRC, evaluation block 152 additionally uses a predetermined CRC polynomial CRC_P, which has a high error detection probability. The CRC polynomial for header check sum HCRC having a CRC length of 13 is indicated below. The length of resulting header check sum HCRC is 13 bits.

CRC generator polynomial CRC_P may be represented in a hexadecimal notation according to various conventions. For example, polynomial CRC_P may be represented as follows:
1. As a polynomial
$x^{13}+x^{12}+x^{11}+x^8+x^7+x^6+x^5+x^2+x^1+1=(x+1)\cdot(x^{12}+x^{10}+x^9+x^8+x^6+x^4+x^3+x^2+1)$
2. With all coefficients (hexadecimal): 0×39E7 (from highest-value $x^{13}$ to lowest-value $x^0$)
3. Normal representation (hexadecimal): 0×19E7 (highest-value coefficient $x^{13}$ omitted)
4. Koopman representation (hexadecimal): 0×1CF3 (lowest-value coefficient $x^0$ omitted)

The aforementioned predetermined CRC polynomial CRC_P has particularly good properties, namely:
a) Hamming distance: HD 6
b) maximum number of useful bits that may be safeguarded: 52
c) particularly small achievable residual error probability in comparison to other CRC polynomials with HD6

Receiving user station (reception node) 10, in particular its frame check module 15 and more precisely its evaluation block 152, may thus detect the class 1 through 4 errors and error case B with a high probability. These errors may be detected by the selected CRC polynomial and its starting value R_S with a particularly high probability, as described above.

Evaluation block 152 outputs a corresponding notification to communication control device 11. Received frame 450 may thus be discarded in the event of an error. Consequently, communication control device 11 may send an error frame 47 to bus 40.

However, if a stuff count field such as the SBC field is used, the residual error probability is further reduced. As a result, it is even more unlikely that a faulty frame 450 is accepted as valid.

Thus, the use of the SBC field "stuff count" field, which encodes the number of dynamic stuff bits in the sent frame, is optional.

If compatibility with CAN FD is not required, for example so-called fixed stuff bits (stuff bits that are always present) may be used in the frame instead of dynamic stuff bits. Without dynamic stuff bits, the class 3 and class 4 errors cannot occur. In addition, a stuff count field such as the SBC field may be omitted. This results in a smaller number of bits to be transferred, and even results in less complexity.

According to a first modification of the first exemplary embodiment, frame check module 15, in particular evaluation block 152, is designed to omit the dynamic stuff bits when forming header check sum HCRC. In contrast, frame check module 15, in particular evaluation block 152, uses the dynamic stuff bits when forming frame check sum FCRC. Frame check module 15, in particular evaluation block 152, once again includes the other bits of the frame header, such as the ID bit, RRS bit, etc., in the computation of frame check sum FCRC. In this way as well, the particular class 3 and class 4 errors are detectable with sufficient reliability. When error frames 47 are used, the detection may be reported via an error frame 47.

According to a second modification of the first exemplary embodiment, frame check module 15, in particular evaluation block 152, is designed to not include the dynamic stuff bits in any computation of check sums HCRC, FCRC. In this way as well, the class 3 and class 4 errors are detectable with sufficient reliability. The reason is that dynamic stuff bits can occur only from the SOF bit until in front of the FDF bit. A maximum of three dynamic stuff bits may be contained in this small range. As a result, the length of the burst error (packet error), which is a block-by-block disturbance of the bit stream, and which may generate a class 3 error, is limited. Consequently, the probability is high that the header CRC is able to detect this burst error. When error frames 47 are used, the detection may be reported via an error frame 47.

According to a third modification of the first exemplary embodiment, insertion block 151 is designed to use value R_S=(0,0,1,1,0,0,0,0,0,0,0,0,0) as predetermined starting value R_S for computing header check sum HCRC. Evaluation block 152 initializes electrical circuit 1521, in particular shift register R, etc., using starting value R_S at the start of each frame 450. The "0" on the left side of predetermined starting value R_S is at the LSB position, for example, i.e., at the lowest-value location for the computation of header check sum HCRC with the aid of the feedback shift register.

When the subsequent bits of the header of frame 450, namely, the bits of identifier ID, the RRS bit, and dynamic stuff bits, are included in the computation of header check sum HCRC, stated predetermined starting value R_S of the present modification achieves the desired effect, namely, to prevent error case B.

The advantage of predetermined starting value R_S=(0,0,1,1,0,0,0,0,0,0,0,0,0) is that it is guaranteed that vector R of header check sum HCRC cannot assume value R="0 . . . 0", even for the two bits which follow the last possible dynamic stuff bits and which are included in the computation of header check sum HCRC. These two subsequent bits are, for example, bit 7 and bit 6 of the payload type.

According to a fourth modification of the first exemplary embodiment, it is not mandatory that CRC generator polynomial CRC_P be used only with one of predetermined starting values R_S mentioned above. Alternatively, some other starting value R_S is usable in which vector R of header check sum HCRC assumes value R="0 . . . 0" as the intermediate result. With such a modification, error case B may be prevented with somewhat lower probability than in the first exemplary embodiment. The detection of error case B via the SBC field is possible.

Figure 6:
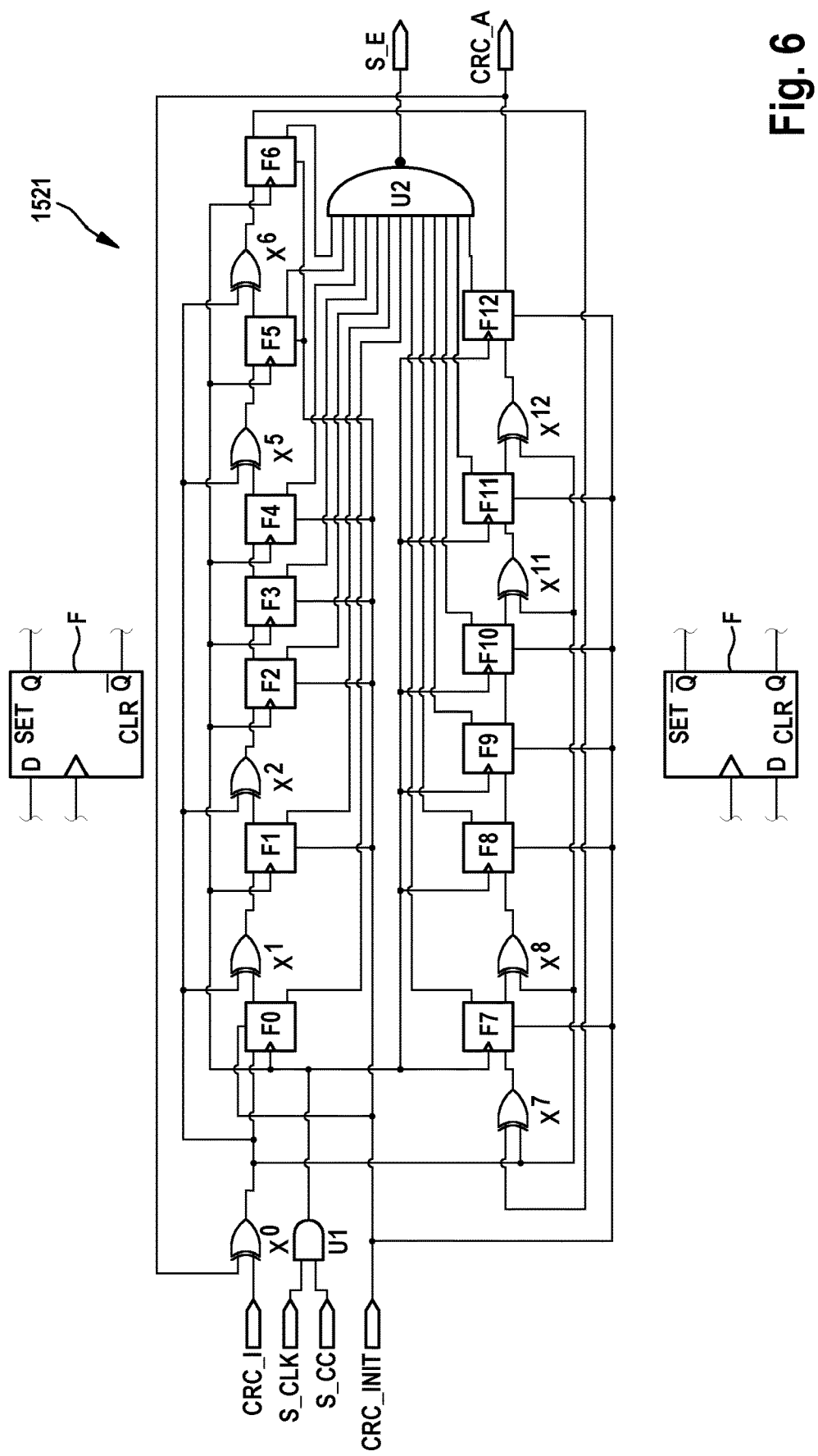
FIG. 6 shows a diagram of an electrical circuit for computing the header check sum according to a second exemplary embodiment of the present invention.

According to a second exemplary embodiment, FIG. 6 shows another example of the design of electrical circuit 1521 from FIG. 3. In other respects, user station 10 has the same design for the two exemplary embodiments.

Circuit 1521 from FIG. 6 is designed as a logic circuit including gates U1, U2, XOR gates $X^0$ through $X^{12}$, and flip-flops F0 through F12 with outputs Q and inverse outputs $\overline{Q}$. Flip-flops F0 through F12 in FIG. 6 all have the same design, even though flip-flops F0 through F6 in FIG. 6 have mirror-image outputs in comparison to flip-flops F7 through F12 in FIG. 6 in order to simplify the illustration of the wiring to gate U2. Flip-flop F at the top in FIG. 6 shows the wiring of input D and of the clock input and of outputs Q, $\overline{Q}$ of flip-flops F0 through F6 in FIG. 6. Flip-flop F at the bottom in FIG. 6 shows the wiring of input D and of the clock input and of outputs Q, $\overline{Q}$ of flip-flops F7 through F12 in FIG. 6.

In circuit 1521, individual flip-flops F0 through F12 are initially set or reset, using signal CRC_INIT, in such a way that the shift register, made up of flip-flops F0 through F12, contains starting value R_S. The serial data stream is fed into circuit 1521 as signal CRC_I. In addition, a clock signal S_CLK and a computation signal S_CC are fed into circuit 1521. Computation signal S_CC indicates whether or not the circuit is to carry out a computation step. At an output, a signal CRC A is output which is entered into field HCRC for header check sum HCRC when electrical circuit 1521 is used by user station 10 as the sender of a frame 450. If an error occurs during the computation of header check sum HCRC when electrical circuit 1521 is used for a frame 450 that is received from user station 10, a signal S E is output, as described above with reference to the first exemplary embodiment.

For computing header check sum HCRC, flip-flops F0 through F12 are brought into their starting position or more precisely, set to starting value R_S, with the aid of signal CRC_INIT. For example, for starting value R_S=(1,0,0,0, 0,0,0,0,0,0,0,0,0), only flip-flop F0 for least significant bit LSB is set to "1". In contrast, all other flip-flops F1 through F12 are set to the value "0".

A work step of circuit 1521 is triggered by the AND operation of clock signal S_CLK, using signal S_CC. The AND operation is executed using AND gate U1. For the bits that are not to be included in the CRC computation, no work step is carried out. For header check sum HCRC, these are the bits having a fixed value, as described above with reference to the first exemplary embodiment.

After the start of header check sum field HCRC, transceiver device 12 transmits signal CRC A onto bus 40 when user station 10 is the sender of frame 450. If user station 10 is only the receiver, i.e., not the sender, of frame 450, signal CRC A is not transmitted, and instead signal S E is used to determine whether or not an error is present in the check sum in field HCRC of frame 450.

In the circuit from FIG. 6, signal CRC_E is generated by a 13-fold NAND gate U2, which links inverse flip-flop outputs $\overline{Q}$. Signal CRC_E is evaluated in a receiving user station 10 after the complete reception of HCRC.

If no error is present, all Q outputs of the CRC FFs are at the value "0" at the end of header check sum field HCRC. In this case, the output or signal CRC_E has the value "0".

If an inverse output $\overline{Q}$ has the value "0", signal CRC_E then indicates the value "1" in order to inform communication control device 11 of the error.

Figure 7:
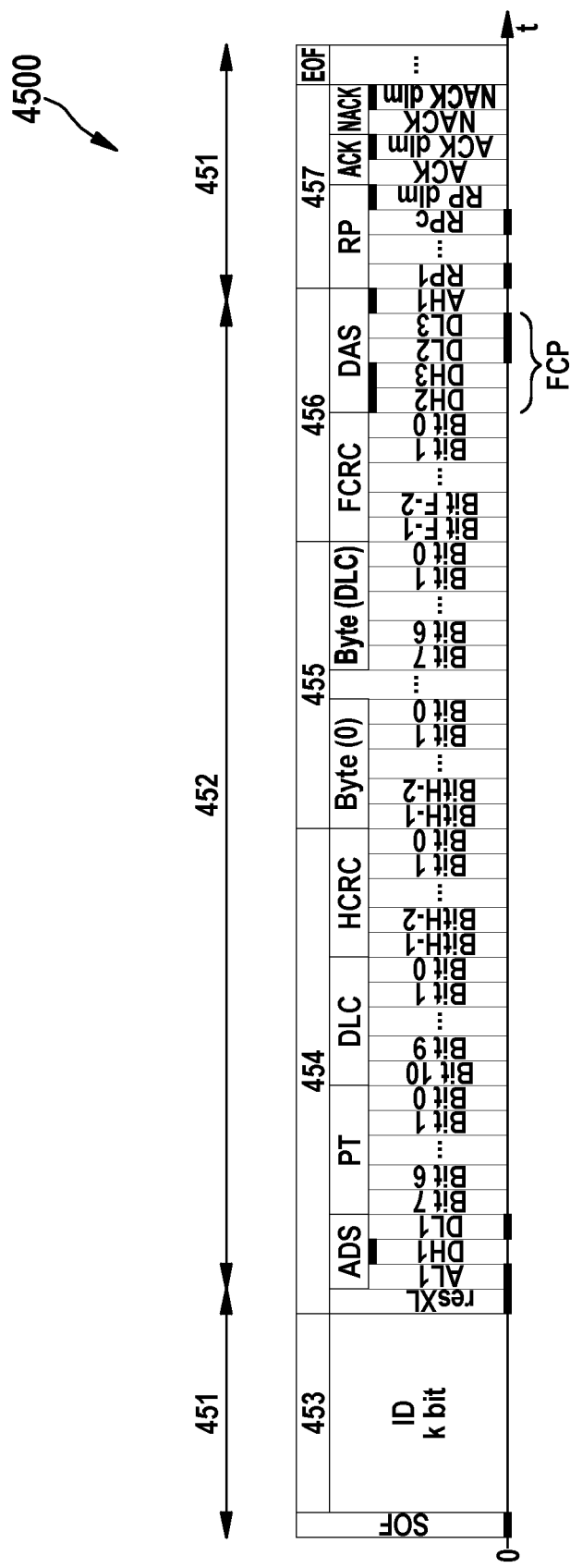
FIG. 7 shows a diagram for illustrating the design of a message that may be sent from a user station of the bus system according to a third exemplary embodiment of the present invention.

FIG. 7 shows a frame 4500 according to a third exemplary embodiment in which CAN XL and CAN FD are not compatible. In this exemplary embodiment, frame 4500 and thus the CAN XL frame format are different from frame 450 from FIG. 2, as described below. Only the differences from frame 450 from FIG. 2 are described below. In other respects, frames 450, 4500 of the two exemplary embodiments are the same.

In general, when creating frame 4500 according to the present exemplary embodiment only the fixed stuffing rule is used, so that a fixed stuff bit is to be inserted after a fixed number of bits. Alternatively, instead of only one stuff bit, two or more bits may also be inserted as fixed stuff bits. For a known value of data length code DLC, this results in a constant frame length or a constant length of frame 4500. This prevents various problems that are caused by dynamic stuff bits. Consequently, an SBC field in the header of frame 4500 is also not necessary.

In frame 4500 according to the present exemplary embodiment, identifier ID is no longer limited to 11 bits or 29 bits as with CAN FD. Number k of the bits of identifier ID may be freely selected. However, number k is alternatively settable to a fixed value. For a high net data rate, an ID including k=8 bits is reasonable. This is sufficient to give each user station 10, 20, 30 of bus system 1 an adequate number of bus access priorities. Of course, some other value of k is selectable, depending on the need and the number of various priorities in bus system 1.

Bits RRS, IDE, FDF, XLF of frame 450 from FIG. 2 are no longer necessary in frame 4500 and are omitted. This saves 4 bits, so that the frame overhead is reduced. The net data rate in bus system 1 is thus increased.

End field EOF includes only five bits in frame 4500 when the NACK bit is dominant. In contrast, if the NACK bit is recessive, end field EOF includes three bits. This ensures that six recessive bits are sent at the end of frame 4500. This number of recessive bits cannot occur at any other location in a valid frame 4500 when a fixed stuff bit is inserted after five identical bits in arbitration phase 451. Alternatively, there could be more than six bits. In particular, the number of EOF bits must be adapted to the number of bits after which a fixed stuff bit is inserted.

Interframe space IFS does not require a minimum length in frame 4500. In particular, interframe space IFS may have the length 0.

In such a case, two frames 4500 are seamlessly sent in succession. However, an interframe space IFS that includes 1 bit, for example, is also reasonable in order to increase the robustness of bus system 1 in comparison to the previously stated case. Due to the now seven recessive bits between two frames 4500, a new user station at bus 40 may synchronize more reliably.

All of the above-described embodiments of user stations 10, 20, 30, of bus system 1, and of the method carried out therein may be used alone or in any possible combination. In particular, all features of the above-described exemplary embodiments and/or modifications thereof may be arbitrarily combined. Additionally or alternatively, in particular the following modifications are possible.

Although the present invention is described above with the example of the CAN bus system, the present invention may be employed for any communications network and/or communication method in which two different communication phases are used in which the bus states, which are generated for the different communication phases, differ. In particular, the present invention is usable for developments of other serial communications networks, such as Ethernet and/or 100Base-T1 Ethernet, field bus systems, etc.

In particular, bus system 1 according to the exemplary embodiments may be a communications network in which data are serially transferable at two different bit rates. It is advantageous, but not a mandatory requirement, that in bus system 1, exclusive, collision-free access of a user station 10, 20, 30 to a shared channel is ensured, at least for certain time periods.

The number and arrangement of user stations 10, 20, 30 in bus system 1 of the exemplary embodiments is arbitrary. In particular, user station 20 in bus system 1 may be dispensed with. It is possible for one or multiple of user stations 10 or 30 to be present in bus system 1. It is possible for all user stations in bus system 1 to have the same design, i.e., for only user station 10 or only user station 30 to be present.

What is claimed is:
1. A user station for a serial bus system, comprising:
a communication control device configured to control a communication of the user station with at least one other user station of the bus system; and
a transceiver device configured to serially transmit a transmission signal, generated by the communication control device, onto a bus of the bus system, and is configured to serially receive signals from the bus of the bus system;
wherein the communication control device is configured to generate the transmission signal according to a frame and to insert a header check sum into the frame, only bits of a frame header that is situated in front of a data field provided for useful data in the frame being included in a computation of the header check sum, the communication control device being configured to insert dynamic stuff bits into the frame header in such a way that an inverse stuff bit is inserted into a bit stream of the frame after 5 identical bits in succession, and for computing the header check sum, the communication control device is configured to use a predetermined starting value and a predetermined check sum polynomial with which an intermediate result of the computation of the header check sum is not equal to a zero vector for a portion of the frame header in which the dynamic stuff bits are used.

2. The user station as recited in claim 1, wherein the predetermined starting value is equal to (1,0,0,0,0,0,0,0,0, 0,0,0,0).

3. The user station as recited in claim 1, wherein the predetermined starting value is equal to (0,0,1,1,0,0,0,0,0, 0,0,0,0).

4. The user station as recited in claim 1, wherein for computing the header check sum, the communication control device is configured to use at least one switching element of an electrical circuit which is settable to the predetermined starting value, the predetermined check sum polynomial being implemented by the switching element or the electrical circuit.

5. The user station as recited in claim 1, wherein the predetermined check sum polynomial is equal to $x^{13}+x^{12}+x^{11}+x^8+x^7+x^6+x^5+x^2+x^1 \pm 1$.

6. The user station as recited in claim 1, wherein the communication control device is configured to insert the dynamic stuff bits only into a first portion of the frame header.

7. The user station as recited in claim 1, wherein the communication control device is configured to insert a field, in which a number of dynamic stuff bits is encoded, into the frame, and the communication control device is configured to insert the at least one field in front of the data field into which the useful data of the frame are inserted.

8. The user station as recited in claim 1, wherein the transceiver device for serially transmitting the transmission signal, generated by the communication control device, onto the bus of the bus system is configured in such a way that for a message that is exchanged between user stations of the bus system, a bit time of a signal that is transmitted onto the bus in a first communication phase is different from a bit time of a signal that is transmitted in a second communication phase.

9. The user station as recited in claim 1, wherein the frame that is formed has a configuration that is compatible with CAN FD, and in a first communication phase it is negotiated which of the user stations of the bus system in a subsequent second communication phase obtains, at least temporarily, exclusive, collision-free access to the bus.

10. A user station for a serial bus system, comprising:
a communication control device configured to control a communication of the user station with at least one other user station of the bus system; and
a transceiver device configured to serially transmit a transmission signal, generated by the communication control device, onto a bus of the bus system, and configured to serially receive signals from the bus of the bus system;
wherein the communication control device is configured to generate the transmission signal according to a frame and to insert a header check sum into the frame, only bits of a frame header that is situated in front of a data field provided for useful data in the frame being included in a computation of the header check sum, the communication control device being configured to insert dynamic stuff bits into the frame header in such a way that an inverse stuff bit is inserted into the bit stream of the frame after 5 identical bits in succession, and for computing the header check sum, the communication control device is configured to use at least one switching element of an electrical circuit which is settable to a predetermined starting value, a predetermined check sum polynomial being implemented by the switching element or the electrical circuit, the predetermined check sum polynomial being equal to $x^{13}+x^{12}+x^{11}+x^8+x^7+x^6+x^5+x^2+x^1+1$.

11. The user station as recited in claim 10, wherein a combination of the predetermined starting value and the predetermined check sum polynomial is configured in such a way that ae intermediate result of the computation of the header check sum is not equal to a zero vector for a portion of the frame header in which dynamic stuff bits are to be inserted by the communication control device.

12. A bus system, comprising:
a bus; and
at least two user stations that are connected to one another via the bus in such a way that they may communicate serially with one another, and of which at least one user station is a user station including:
a communication control device configured to control a communication of the user station with at least one other user station of the bus system; and
a transceiver device configured to serially transmit a transmission signal, generated by the communication control device, onto the bus of the bus system, and is configured to serially receive signals from the bus of the bus system;
wherein the communication control device is configured to generate the transmission signal according to a frame and to insert a header check sum into the frame, only bits of a frame header that is situated in front of a data field provided for useful data in the frame being included in a computation of the header check sum, the communication control device being configured to insert dynamic stuff bits into the frame header in such a way that an inverse stuff bit is inserted into a bit stream of the frame after 5 identical bits in succession, and for computing the header check sum, the communication control device is configured to use a predetermined starting value and a predetermined check sum polynomial with which an intermediate result of the computation of the header check sum is not equal to a zero vector for a portion of the frame header in which the dynamic stuff bits are used.

13. A method for communicating in a serial bus system, the method being carried out using a user station of the bus system that includes a communication control device and a transceiver device, the method comprising the following steps:
controlling, via the communication control device, a communication of the user station with at least one other user station of the bus system;
transmitting, via the transceiver device, a transmission signal, generated by the communication control device, onto a bus of the bus system, the transceiver device also being configured to serially receive signals from the bus of the bus system;

generating, via the communication control device, the transmission signal according to a frame, the communication control device inserting a header check sum into the frame, only bits of a frame header that is situated in front of a data field provided for useful data in the frame being included in a computation of the header check sum, the communication control device inserting dynamic stuff bits into the frame header in such a way that an inverse stuff bit is inserted into the bit stream of the frame after 5 identical bits in succession, and for computing the header check sum, the communication control device being configured to use a predetermined starting value and a predetermined check sum polynomial with which an intermediate result of the computation of the header check sum is not equal to a zero vector for a portion of the frame header in which the dynamic stuff bits are used.

* * * * *